United States Patent
Amirijoo et al.

(10) Patent No.: US 9,220,039 B2
(45) Date of Patent: Dec. 22, 2015

(54) INTER-RAT/FREQUENCY AUTOMATIC NEIGHBOR RELATION LIST MANAGEMENT

(71) Applicant: Telefonaktiebolaget L M Ericsson (publ), Stockholm (SE)

(72) Inventors: Mehdi Amirijoo, Linkoping (SE); Pal Frenger, Linkoping (SE); Fredrik Gunnarsson, Linkoping (SE); Harald Kallin, Sollentuna (SE); Johan Moe, Mantorp (SE); Kristina Zetterberg, Linkoping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 70 days.

(21) Appl. No.: 14/051,090

(22) Filed: Oct. 10, 2013

(65) Prior Publication Data

US 2014/0106756 A1 Apr. 17, 2014

Related U.S. Application Data

(60) Continuation of application No. 13/281,818, filed on Oct. 26, 2011, now Pat. No. 8,583,104, which is a division of application No. 12/331,897, filed on Dec. 10, 2008, now Pat. No. 8,107,950.

(60) Provisional application No. 61/023,469, filed on Jan. 25, 2008.

(51) Int. Cl.
*H04W 36/00* (2009.01)
*H04W 36/14* (2009.01)
*H04W 48/12* (2009.01)

(52) U.S. Cl.
CPC .......... *H04W 36/0083* (2013.01); *H04W 36/14* (2013.01); *H04W 48/12* (2013.01)

(58) Field of Classification Search
CPC . H04W 36/0083; H04W 36/14; H04W 48/12; H04W 24/08; H04W 36/008; H04W 72/085
See application file for complete search history.

(56) References Cited

U.S. PATENT DOCUMENTS

| 7,181,218 B2 | 2/2007 | Ovesjo et al. |
| 8,107,950 B2 * | 1/2012 | Amirijoo et al. ............... 455/423 |

(Continued)

FOREIGN PATENT DOCUMENTS

WO 2008104196 A1 9/2008

OTHER PUBLICATIONS

3GPP TR 32.816, "Study on Management of E-UTRAN and SAE", V1.3.1 (Nov. 2007).

(Continued)

*Primary Examiner* — Diane Mizrahi
(74) *Attorney, Agent, or Firm* — Rothwell, Figg, Ernst & Manbeck, P.C.

(57) ABSTRACT

In one of its aspects the technology concerns a method of operating a telecommunications system comprising a serving radio base station and a candidate radio base station. The serving radio base station comprises a radio base station to which a wireless mobile station provides measurement reports. The serving radio base station and the candidate radio base station are different with respect to at least one of frequency and radio access technology. The method comprises the serving radio base station allowing the mobile station to obtain information broadcasted by the candidate radio base station. The information is either information for locating Cell Global Identity (CGI) of the candidate radio base station or the Cell Global Identity (CGI) itself of the radio base station. The mobile station obtains the information from the candidate radio base station during at least one reading gap. The reading gap is a time period in which the mobile station does not receive information from the serving radio base station.

11 Claims, 10 Drawing Sheets

(56) References Cited

U.S. PATENT DOCUMENTS

| | | | | |
|---|---|---|---|---|
| 8,583,104 | B2* | 11/2013 | Amirijoo et al. | 455/423 |
| 2006/0223557 | A1 | 10/2006 | Manohar | |
| 2007/0037601 | A1 | 2/2007 | Mittal et al. | |
| 2008/0274742 | A1* | 11/2008 | Bi | 455/437 |
| 2012/0294694 | A1* | 11/2012 | Garot | 411/427 |
| 2013/0010964 | A1* | 1/2013 | Fong et al. | 380/277 |
| 2014/0092761 | A1* | 4/2014 | Behravan et al. | 370/252 |
| 2014/0094125 | A1* | 4/2014 | Behravan et al. | 455/63.1 |
| 2014/0293818 | A1* | 10/2014 | Sesia et al. | 370/252 |

OTHER PUBLICATIONS

International Search Report and Written Opinion mailed Apr. 21, 2009 in corresponding PCT application No. PCT/SE2006/051479.
3GPP Draft; R2-060987, 3rd Generation Partnership Project (3GPP), Mobile Competence Centre, 650, Route Des Lucioles, F-06921 Sophia-Antipolis Cedex, France, vol. tsg_ran/WG2-RL2TSGR2_52/Documents/Joint_R1_R2, no. Athens, Greece, Mar. 27, 2006, Mar. 20, 2006.
"Measurement Grap Control for E-UTRAN to GERAN Handover, GR-070006", Sep. 27, 2007, pp. 1-5.
NGMN, "Operator Use Cases Related to Self Organising Networks", Ver. 1.53, Apr. 16, 2007.
3GPP TS 45.002, "Multiplexing and Multiple Access on the Radio Path", V7.7.0 (May 2008).
3GPP TS 25.331, "Radio Resource Control (RRC); Protocol Specification", V9.4.0 (Sep. 2010).
Baliosian, J,. et al., "Decentralized Configuration of Neighboring cells for Radio Access Networks", 1st IEEE Workshop on Autonomic Wireless Access (in conjunction with IEEE WoWMoM), 2007.
Notice of Allowance issued in Japanese Application No. 2010-544266 dated May 27, 2013.

\* cited by examiner

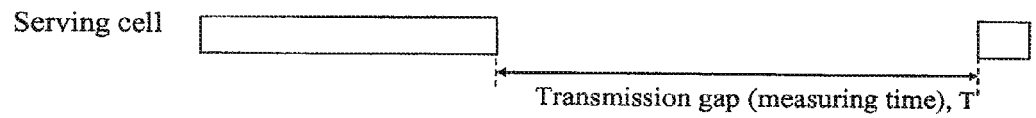
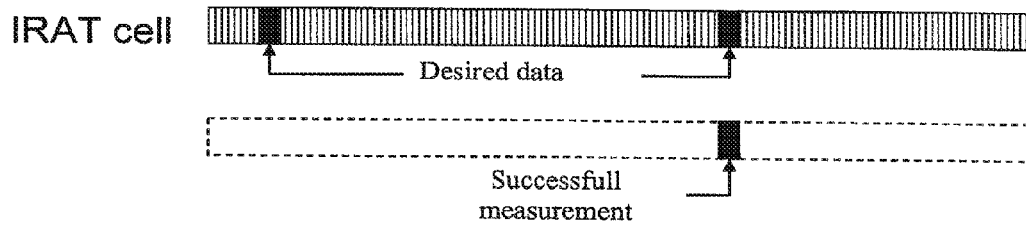
Fig. 7
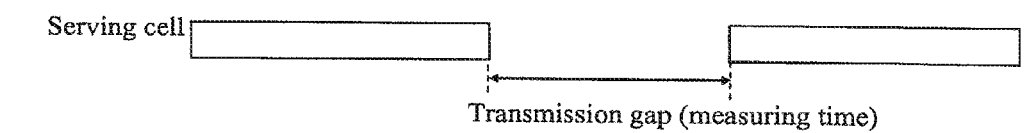
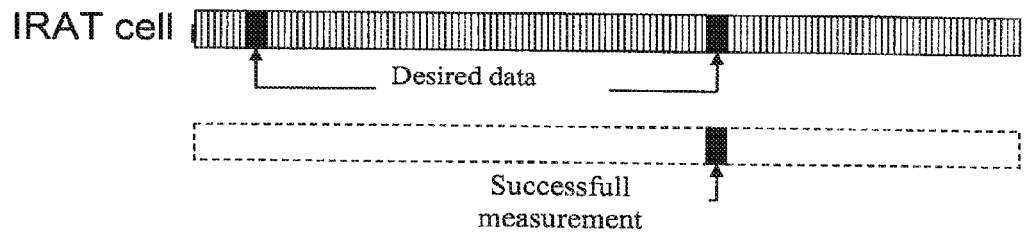
Fig. 8
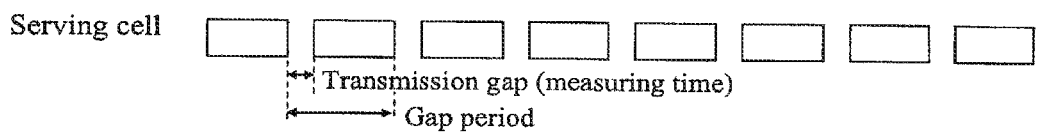
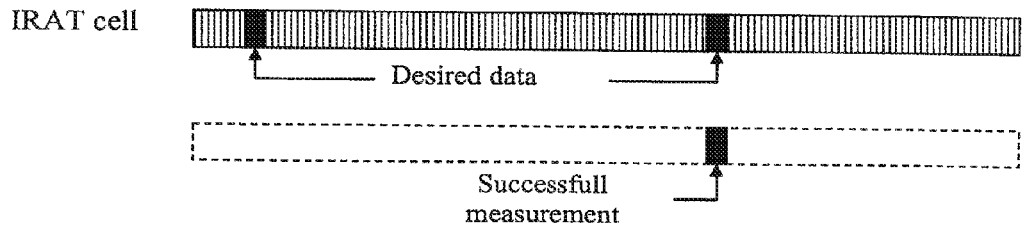
Fig. 9

INTER-RAT/FREQUENCY AUTOMATIC NEIGHBOR RELATION LIST MANAGEMENT

This application is a continuation of U.S. patent application Ser. No. 13/281,818, filed Oct. 26, 2011, pending, which is a divisional of U.S. patent application Ser. No. 12/331,897, filed Dec. 10, 2008 (now U.S. Pat. No. 8,107,950), which claims the benefit of U.S. Provisional Patent Application Ser. No. 61/023,469, filed Jan. 25, 2008. Each of the above mentioned applications and the above mentioned patent is incorporated by reference.

BACKGROUND

I. Technical Field

This invention pertains to telecommunications, and particularly an inter-radio access technology (IRAT) and inter-frequency measurement(s) involved with neighbor relation list management.

II. Related Art and Other Considerations

In a typical cellular radio system, wireless terminals (also known as mobile stations and/or user equipment units (UEs)) communicate via a radio access network (RAN) to one or more core networks. The wireless terminals can be mobile stations or user equipment units (UE) such as mobile telephones ("cellular" telephones) and laptops with wireless capability), e.g., mobile termination), and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station, e.g., a radio base station (RBS), which in some networks is also called "NodeB" or "B node". A cell is a geographical area where radio coverage is provided by the radio base station equipment at a base station site. Each cell is identified by a identity within the local radio area, which is broadcast in the cell. The base stations communicate over the air interface operating on radio frequencies with the user equipment units (UE) within range of the base stations.

In some versions (particularly earlier versions) of the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN is essentially a radio access network using wideband code division multiple access for user equipment units (UEs). The Third Generation Partnership Project (3GPP) has undertaken to evolve further the UTRAN and GSM based radio access network technologies.

Specifications for the Evolved Universal Terrestrial Radio Access Network (E-UTRAN) are ongoing within the 3.sup.rd Generation Partnership Project (3GPP). The Evolved Universal Terrestrial Radio Access Network (E-UTRAN) comprises the Long Term Evolution (LTE) and System Architecture Evolution (SAE).

An inter-radio access technology (RAT) handover is process wherein a mobile terminal switches from using a first radio access system having a first radio access technology (such as GSM) to a second radio access system having a second radio access technology (such as UTRA). Inter-RAT handover is normally initiated when the quality of a downlink radio connection of the first radio access network falls below a certain level. Inter-radio access technology (RAT) handovers are described, e.g., in U.S. Pat. No. 7,181,218, entitled "COMMANDING HANDOVER BETWEEN DIFFERING RADIO ACCESS TECHNOLOGIES", which is incorporated herein by reference in its entirety.

Long Term Evolution (LTE) is a variant of a 3GPP radio access technology wherein the radio base station nodes are connected directly to a core network rather than to radio network controller (RNC) nodes. In general, in LTE the functions of a radio network controller (RNC) node are performed by the radio base stations nodes. As such, the radio access network (RAN) of an LTE system has an essentially "flat" architecture comprising radio base station nodes without reporting to radio network controller (RNC) nodes.

The evolved UTRAN (E-UTRAN) comprises evolved base station nodes, e.g., evolved NodeBs or eNBs, providing evolved UTRA user-plane and control-plane protocol terminations toward the user equipment unit (UE). The eNB hosts the following functions (among other functions not listed): (1) functions for radio resource management (e.g., radio bearer control, radio admission control), connection mobility control, dynamic resource allocation (scheduling); (2) mobility management entity (MME) including, e.g., distribution of paging message to the eNBs; and (3) User Plane Entity (UPE), including IP Header Compression and encryption of user data streams; termination of U-plane packets for paging reasons, and switching of U-plane for support of UE mobility. The eNB hosts the PHYsical (PHY), Medium Access Control (MAC), Radio Link Control (RLC), and Packet Data Control Protocol (PDCP) layers that include the functionality of user-plane header-compression and encryption. The eNodeB also offers Radio Resource Control (RRC) functionality corresponding to the control plane. The eNodeB performs many functions including radio resource management, admission control, scheduling, enforcement of negotiated UL QoS, cell information broadcast, ciphering/deciphering of user and control plane data, and compression/decompression of DL/UL user plane packet headers.

2G and 3G systems, including E-UTRAN, make use of Mobile Assisted handover (MAHO). Each mobile station (MS) periodically monitors the signal quality of the serving base station (BS) as well as the signal quality of base stations in its surroundings and may report the measurements back to the serving radio base station. The radio network typically initiates handovers based on these measurements. As an example, consider the case of a prepared handover (HO) in E-UTRAN. The target or candidate base station (BS), which the mobile station (MS) will be handed off to, gives guidance for the mobile station (MS) on how to make the radio access, e.g., radio resource configuration and necessary identities. Further, the serving base station (BS) needs to forward user plane data to the target base station (BS), meaning that the target base station (BS) must be known and its unique identity, so-called Cell Global Identity (CGI), must be established before executing the HO.

Typically, there is also a local identifier (ID) defined for each base station (BS). The local ID of a base station (BS) is used for layer-1 measurements and is not long enough to be unique within the network. For example, a mobile station (MS) reports the signal quality of a base station (BS) along with its local ID to the serving base station (BS). The local ID is not enough for a handover (HO), since the local ID is not unique within the network. As such, when handing off a mobile station (MS) to the neighbor the CGI of the neighbor must be known. The neighbor relation list (NRL), thus constitutes or is at least involved in the mapping from the local ID to the Cell Global Identity (CGI) and possibly also other information such as the IP address of the target base station (BS).

It is envisioned that E-UTRAN will initially have a limited radio coverage. To provide seamless mobility it is necessary to Hand Over (HO) mobile stations (MSs) in E-UTRAN to an alternative Radio Access Technology (RAT) such as GSM EDGE Radio Access Network (GERAN) or UTRAN with better coverage. It is also desired for a mobile station (MS) served by 2G (e.g. GERAN) or 3G (e.g. UTRAN), to switch to E-UTRAN once the mobile station (MS) is within the coverage of E-UTRAN. The latter is desired since higher data rates are offered by E-UTRAN, enabling services with greater bandwidth requirements. Handover between two different RATs is referred to as an inter-RAT (IRAT) handover. Further, it is projected that LTE will operate in multiple frequency bands. To handle issues like load balancing between different frequency bands, which require inter-frequency handovers (HO), IRAT and inter-frequency neighbor relation lists (NRLs) are established.

One focus area in E-UTRAN standardization work is to ensure that the new network is simple to deploy and cost efficient to operate. The vision is that the new system shall be self-optimizing and self-configuring in as many aspects as possible. See, e.g., 3GPP TR 32.816, Study on Management of E-UTRAN and SAE.

For inter-RAT/frequency HOs the serving base station (BS) needs to be able to trigger inter-RAT/frequency measurements, make a comparison between different RATs/frequencies, and make a HO decision. The following events typically need to be performed to prepare for HOs from a serving base station (BS) to a target base station (BS) (e.g. from a E-UTRAN BS to a UTRAN BS) as shown in FIG. 13 (the axses represent serving and candidate BS quality): If the estimated signal quality of the serving base station (BS) falls below a certain threshold (threshold A in FIG. 13), then inter-RAT/frequency measurements performed by the mobile station (MS) are triggered. If the estimated signal quality of the serving base station (BS) rises above a certain threshold (threshold A in FIG. 13), then inter-RAT/frequency measurements performed by the mobile station (MS) are stopped. If the estimated signal quality of the serving base station (BS) is below a certain threshold (threshold A in FIG. 13) and the estimated signal quality of the candidate base station (BS) is above a threshold (B in FIG. 13), then the inter-RAT/frequency HO procedure may be initiated.

For a mobile station (MS) with a single receiver, the receiving frequency of the mobile station (MS) has to be altered when carrying out inter-RAT/frequency measurements. When changing the frequency (during inter-RAT/frequency measurements), the mobile station (MS) is not able to communicate with the serving RAT. The state during which the mobile station (MS) carries out inter-RAT/frequency measurements is called the reading gap. The serving base station may avoid transmissions to the mobile station (MS) during the reading gap. The state during which a base station does not transmit to a mobile station (MS) is referred to as a transmission gap. Note that, in order for the mobile station (MS) to use the time of the transmission gap for inter-RAT/frequency measurements, a reading gap must be issued. From now on, it is assumed that a reading gap is always issued by the concerned mobile station (MS) when the serving base station (BS) issues a transmission gap. A reading gap can however be issued by the mobile station (MS) even if no transmission gap has been issued by the base station (BS). The gaps may occur periodically according to a predefined pattern, as shown in FIG. 14, or may be event-triggered. Further, the length of the gaps may be fixed or varying.

Some RATs, e.g., E-UTRAN and UTRAN, support dynamic scheduling of uplink (UL) and/or downlink (DL) data, where radio resources are assigned to users and radio bearers according to the users momentary traffic demand, QoS requirements, and estimated channel quality. The base station (BS) may assign radio resources in time or frequency to mobile stations with, e.g., higher channel quality. The smallest schedulable resource entity is hereafter called a Scheduling Block (SB).

As an example, in E-UTRAN, the scheduling block (SB) comprises two consecutive resource blocks, with a total length of 1 ms and width of 180 kHz, see FIG. 15. In this case, the base station (BS) allocates SBs to mobile stations both in time and frequency. In E-UTRAN, a mobile station (MS) may be configured to report Channel Quality Indicator (CQI) reports, indicating the quality of the DL. Based on the CQI reports and QoS requirements the scheduler assigns SBs.

Previously in 2G (e.g., GERAN) and 3G (e.g., UTRAN) systems NRL lists have been populated using planning tools by means of coverage predictions before the installation of a base station (BS). Prediction errors, due to inaccuracies in topography data and wave propagation models, have forced the operators to resort to drive/walk tests to completely exhaust the coverage region and identify all handover regions and as such the neighbors. Since a radio network gradually evolves over time with new cells and changing interference circumstances, traditional planning of NRL requires iterative repetitions of the planning procedure. This has proven to be costly and new methods for automatically deriving NRLs are required. Thus, it is essential to make use of automatic in-service approaches for generating and updating NRLs.

The known existing solution aiming at automating NRL management only address one particular RAT, e.g., GERAN or UTRAN. See, e.g., PCT Patent Application PCT/EP2007/001737, filed Feb. 28, 2007, which is incorporated herein by reference in its entirety. Even though NRL management has been automated for one type of RAT, the problem of establishing NRLs for different RATs/frequencies has not been solved before. Traditionally, these inter-RAT/frequency NRLs have been manually derived using topographical information and drive/walk testing. This has proven to be rather tedious and costly and new automated methods where the network itself establishes and configures the NRLs are needed.

What is needed therefore, and an object of this invention, are apparatus, methods, and techniques for establishing and managing inter-RAT measurements and information, such as that utilized by a neighbor relation list for inter-RAT/frequency mobility.

SUMMARY

The technology provides apparatus, methods, and techniques for automatically managing relationships to neighbors in other RATs/frequencies, for example neighbor relation lists (NRLs) in E-UTRAN containing GERAN and UTRAN neighbors. The technology encompasses: Methods & apparatus to detect new inter-RAT/frequency neighbor base stations using mobile station (MS) measurements. Methods and apparatus to retrieve the neighbor base station (BS) CGIs with little or no disturbance of the ongoing traffic in the serving RAT/frequency. Methods and apparatus for establishing new neighbors and updating the NRL.

The technology serves, e.g., advantageously to reduce operator expenses for planning and maintaining inter-RAT/frequency NRLs needed for seamless inter-RAT/frequency mobility.

In one of its aspects the technology concerns a method of operating a telecommunications system comprising a serving radio base station and a candidate radio base station. The serving radio base station comprises a radio base station to which a wireless mobile station provides measurement reports. The serving radio base station and the candidate radio base station are different with respect to at least one of frequency and radio access technology. The method comprises the serving radio base station allowing the mobile station to obtain information broadcasted by the candidate radio base station; and the mobile station obtaining the information from the candidate radio base station during at least one reading gap. The information is either information for locating Cell Global Identity (CGI) of the candidate radio base station or the Cell Global Identity (CGI) itself of the radio base station. The reading gap is a time period in which the mobile station does not receive information from the serving radio base station.

The information can take various forms. For example, depending on the context and timing, the information can be synchronization information of the candidate radio base station, local identification information of the candidate radio base station, information for locating Cell Global Identity (CGI) of the candidate radio base station, or even the Cell Global Identity (CGI) itself.

In a first example embodiment and mode, the method further comprises the serving radio base station issuing a transmission gap to the mobile station (the transmission gap has a predetermined duration during which the mobile station is able to obtain the information from the candidate radio base station); and the mobile station obtaining the information from the candidate radio base station during the transmission gap.

In a variation of the first example embodiment and mode, the mobile station informs the serving radio base station that the mobile station will issue the at least one reading gap (with a predetermined duration during which the mobile station is able to obtain the information from the candidate radio base station); and in response thereto, the serving radio base station issues the transmission gap to the mobile station.

In a second example embodiment and mode, the method further comprises the serving radio base station starting a transmission gap and allowing the mobile station to obtain information broadcasted by the candidate radio base station; and, the serving radio base station terminating the transmission gap upon receiving the information from the mobile station.

In a variation of the second example embodiment and mode, the mobile station makes a request that the serving radio base station issue the transmission gap; and upon making the request, the mobile station starts a reading gap for obtaining the information.

In a third example embodiment and mode, the method further comprises the serving radio base station issuing periodic transmission gaps of fixed length to the mobile station (whereby, e.g., at least one of the transmission gaps is aligned with a broadcast frame of the candidate radio base station in which the information is broadcast by the candidate radio base station); and the mobile station obtaining the information during one of the period transmission gaps.

In a fourth example embodiment and mode, the method further comprises the mobile station issuing the at least one reading gap for obtaining the information from the candidate radio base station and ignoring transmissions from the serving radio base station during the reading gap. An augmentation of the fourth example embodiment and mode comprises the mobile station further recovering any frames lost during the at least one reading gap by using a repeat request procedure.

Alternatively, non-receipt of predetermined reports from the mobile station indicates that the mobile station has issued the at least one reading gap and accordingly modifying communications between the serving radio base station and the mobile station (e.g., by lowering priority of transmissions to the mobile station or by ceasing allocation of scheduling resources to the mobile station).

As a further aspect, the technology can further comprise the serving radio base station providing the information to a neighbor relation list handler.

In an illustrated, example context or environment of use, the candidate radio base station belongs to a GERAN radio access network and the serving radio base station belongs to another radio access technology (e.g., UTRAN). Conversely, in another illustrated, example context or environment of use, the candidate radio base station belongs to a UTRAN radio access network and the serving radio base station belongs to another radio access technology In another of its aspects the technology concerns a mobile station configured for wireless operation in a telecommunications system comprising a serving radio base station and a candidate radio base station. The mobile station (MS) comprises one or more transceivers and a mobile station measurement communication function. The one or more transceivers are configured to implement wireless transmissions between the mobile station and the serving radio base station and between the mobile station and the candidate radio base station. The mobile station measurement communication function is configured to obtain information from the candidate radio base station during at least one reading gap, the information being either information for locating Cell Global Identity (CGI) of the candidate radio base station or the Cell Global Identity (CGI) itself of the radio base station. In an example implementation, the mobile station measurement communication function is configured to obtain a first type of information from the candidate radio base station during at least one reading gap and to obtain second type of information from the candidate radio base station during at least another reading gap, each reading gap being a time period in which the mobile station does not receive information from the serving radio base station.

In another of its aspects the technology concerns a base station configured for wireless operation in a telecommunications system comprising a serving radio base station and a candidate radio base station, as well as a mobile station. The base station comprises a transceiver and a base station measurement communication function. The transceiver is configured to implement wireless transmissions between the mobile station and the serving radio base station and between the mobile station and the candidate radio base station. The base station measurement communication function is configured to allow the mobile station to obtain information from the candidate radio base station during at least one reading gap, the information being either information for locating Cell Global Identity (CGI) of the candidate radio base station or the Cell Global Identity (CGI) itself of the radio base station. In an example implementation, the base station measurement communication function is configured to allow the mobile station to obtain a first type of information from the candidate radio base station during at least one reading gap and to allow the mobile station to obtain a second type of information from the candidate radio base station during at least another reading gap, each reading gap being a time period in which the mobile station does not receive information from the serving radio base station.

Some example embodiments can use a two-stage information acquisition procedure for acquiring the ultimate necessary information (e.g., Cell Global Identity (CGI)) of the candidate base station. In the two stage information acquisition procedure, a first type of information is first acquired from the candidate base station. The first type of information is utilized to determine how to obtain a second type of information (e.g., the ultimately sought information, such as CGI) from the candidate base station. Thus, in one example embodiment and mode, the method comprises acts including the following: (a) the mobile station obtaining a first type of information from the candidate radio base station during at least one reading gap (the reading gap being a time period in which the mobile station does not receive information from the serving radio base station); (b) using the first type of information to determine how to obtain a second type of information broadcast by the candidate radio base station; (c) the serving radio base station allowing the mobile station to obtain the second type of information broadcasted by the candidate radio base station; and, (d) the mobile station obtaining the second type of information from the candidate radio base station during at least another reading gap.

In the foregoing embodiment and method, wherein the first type of information can be one or more of synchronization information of the candidate radio base station; local identification information of the candidate radio base station; information for locating Cell Global Identity (CGI) of the candidate radio base station; and/or the Cell Global Identity (CGI) itself.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 7 is a diagrammatic view showing illustrating of an example embodiment and mode wherein a transmission gap is set sufficiently long (e.g., worse case scenario) to find desired information.

FIG. 8 is a diagrammatic view showing illustrating of an example embodiment and mode wherein a transmission gap occurs until desired information is obtained and reported (in FIG. 8, signaling delays between the mobile station (MS) and the serving radio base station are omitted, but would result in the transmission gap to end being later than as indicated in FIG. 8).

FIG. 9 is a diagrammatic view showing illustrating of an example embodiment and mode which uses sliding transmission gaps.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

1.0 OVERVIEW

1.1 Architectural Overview Examples

Figure 1:
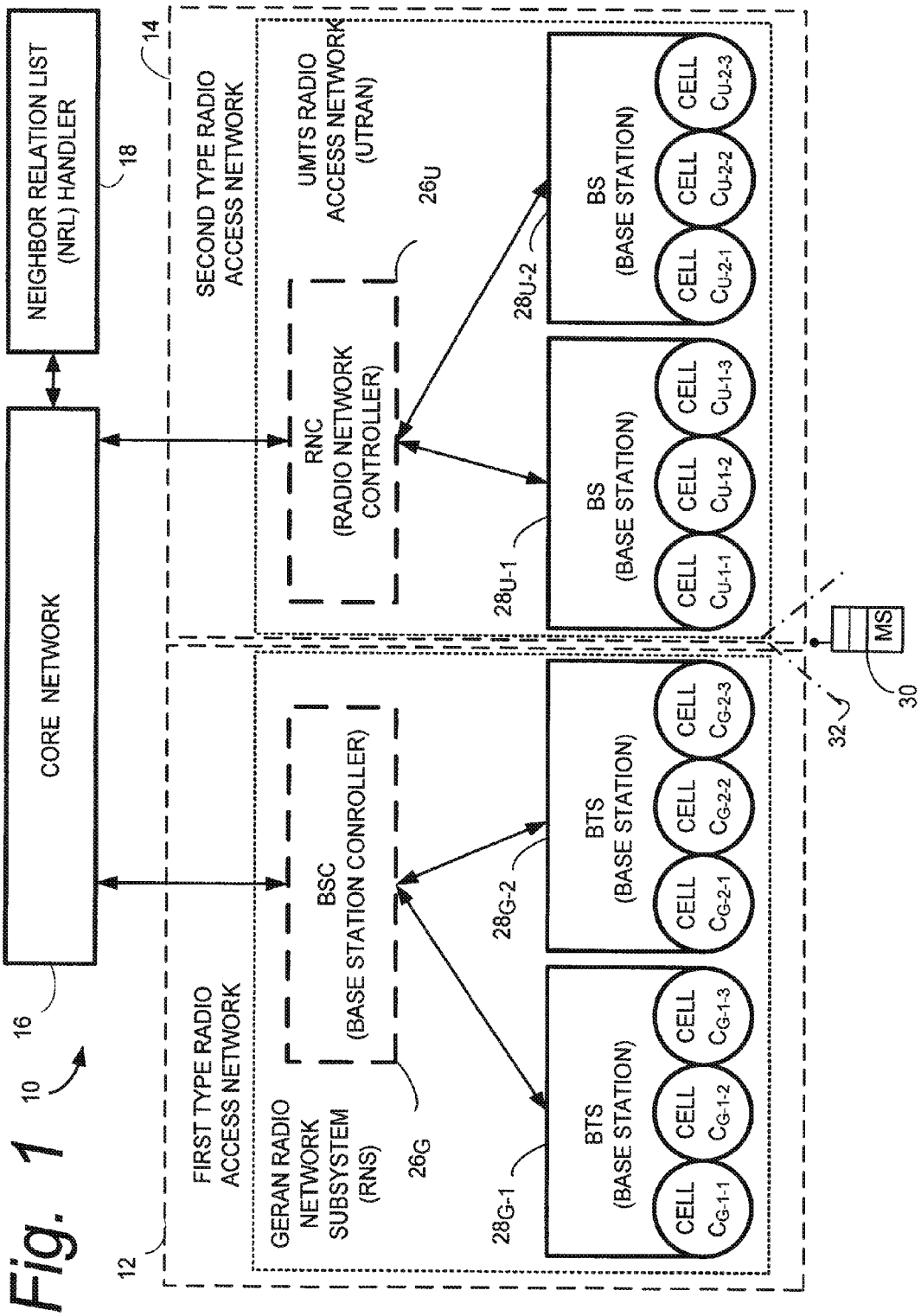
FIG. 1 is a diagrammatic view of a telecommunications system operating in conjunction with both a first radio access network having a first type radio access technology and a second radio access network having a second type radio access technology.

FIG. 1 shows an example telecommunications system 10 operating in conjunction with both a first radio access network 12 and a second radio access network 14. In the example telecommunications system 10 of FIG. 1, first radio access network 12 has a first type radio access technology (RAT) and second radio access network 14 has a second type radio access technology. In the non-limiting example shown in FIG. 1, it so happens that first radio access network 12 uses GERAN radio access technology, while the second radio access network 14 uses UTRAN (or E-UTRAN) radio access technology. Both first radio access network 12 and second radio access network 14 are connected to an external core network 16, such may be (for example) the Public Switched Telephone Network (PSTN) and/or the Integrated Services Digital Network (ISDN). The core network 16 can comprise, or otherwise have access to, neighbor relation list (NRL) handler 18.

Both first radio access network 12 and second radio access network 14 comprise radio base stations, generically referred to as "base stations", and optionally include a controlling node such as a base station controller (BSC) or radio network controller (RNC) for supervising one or more base stations. Whether one or both of first radio access network 12 and second radio access network 14 include a controlling node depends on specific architecture of the particular radio access network, since some radio access networks (such as E-UTRAN) have an essentially flat structure achieved by eliminating the controlling node(s) and consolidating various functions in the base station, as previously explained. In the particular example shown in FIG. 1 in which first radio access network 12 is presumed for sake of illustration to be a GERAN type radio access network and second radio access network 14 is presumed to be a UTRAN, supervising nodes are illustrated (albeit with broken lines to show their optional presence in some types of radio access networks).

The first radio access network 12 thus includes one or more base station controllers (BSCs) 26.sub.G, with each base station controller (BSC) 26.sub.G controlling one or more base stations (BTSs) 28.sub.G. In the example shown in FIG. 1, base station controller (BSC) 26.sub.G is connected to two base stations, particularly base station (BTS) 28.sub.G-1 and base station (BTS) 28.sub.G-2. Each base station (BTS) 28.sub.G is depicted in FIG. 1 as serving three cells C. Each cell C is represented by a circle proximate the respective base station. Thus, it will be appreciated by those skilled in the art that a base station may serve for communicating across the air interface for more than one cell, and that differing base stations may serve differing numbers of cells. The base station controllers (BSCs) 26.sub.G controls radio resources and radio connectivity within a set of cells, e.g., the cells C.sub.G shown in FIG. 1. Each base station (BTS) 28.sub.G handles the radio transmission and reception within one or more cells.

The second radio access network 14 includes one or more radio network controllers (RNCs) 26.sub.U. For sake of simplicity, the UTRAN 14 of FIG. 1 is shown with only one RNC node, although typically more than one such node is typically provided. The RNC node 26.sub.U is connected to a plurality of base stations (BS) 28.sub.U. For example, and again for sake of simplicity, two base station nodes—base station (BS) 28.sub.U-1 and base station (BS) 28.sub.U-2—are shown connected to RNC 26.sub.U. It will again be appreciated that a different number of base stations can be served by an RNC, and that RNCs need not serve the same number of base stations. As in GERAN network 12, in UTRAN network 14 for sake of simplicity each base station 28.sub.U is shown as serving three cells (each such cell being labeled at least partially as C.sub.U). In second radio access network (UTRAN network) 14, the radio network controller (RNC) 26.sub.U controls radio resources and radio connectivity within a set of cells C.sub.U, while the base stations (BS) 28.sub.U handle the radio transmission and reception within one or more cells.

A wireless mobile station (MS) 30 is shown in FIG. 1. As used herein, the term "mobile station (MS)" generically encompasses both the notion of a mobile station and the notion of a user equipment unit (UE), as well as other concepts as previously explained. As explained herein, one of the base stations of one of the radio access networks (either first radio access network 12 or second radio access network 14) serves as a serving base station for mobile station (MS) 30 and another of the base stations of the other of the radio access networks may be a candidate base station for mobile station (MS) 30. Thus, for example, cell C.sub.G-2-3 of first radio access network 12 may be the serving base station for mobile station (MS) 30, but in view of proximity and/or reception cell C.sub.U-1-1 may be a candidate base station. The converse could also occur.

Figure 2:
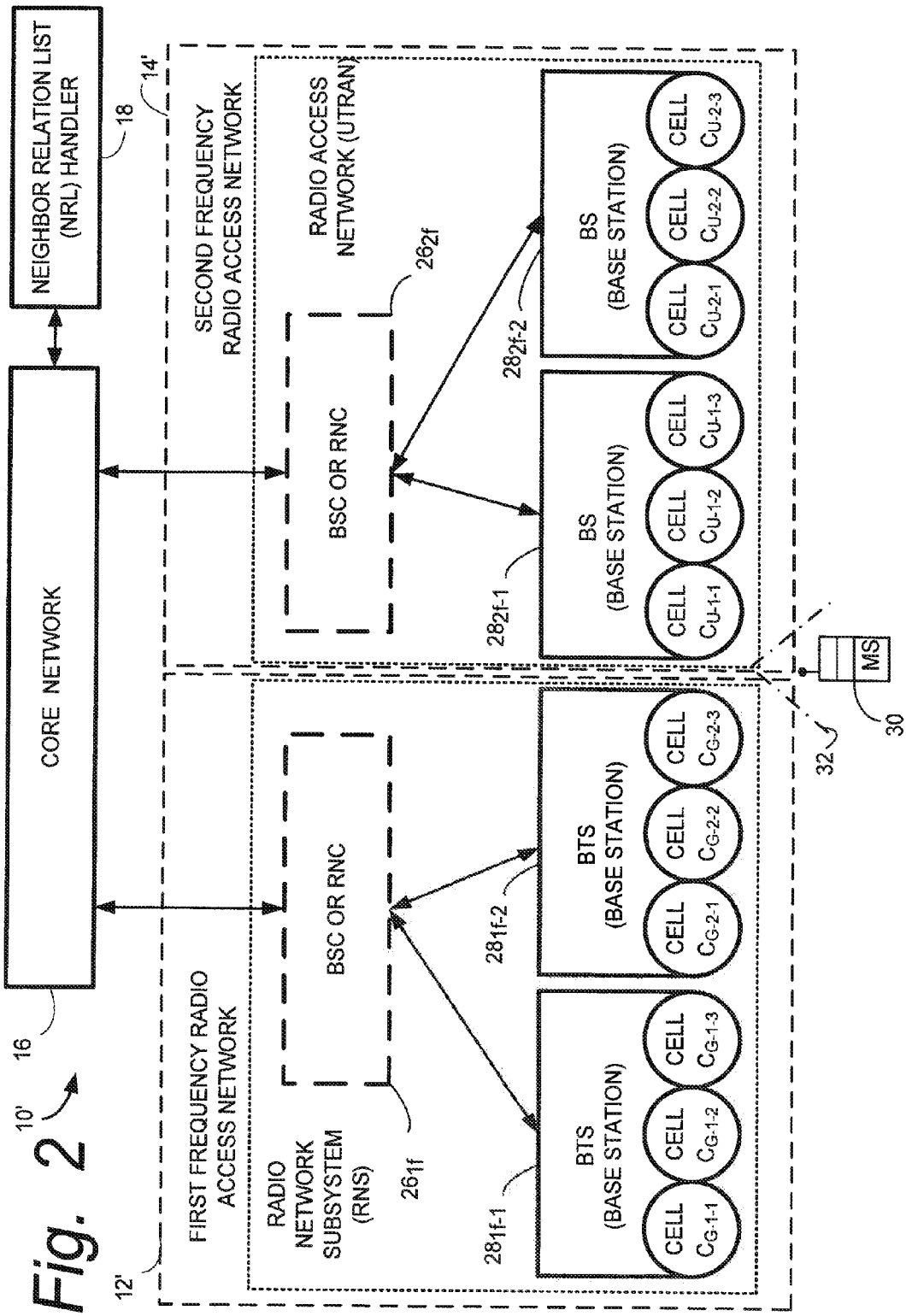
FIG. 2 is a diagrammatic view of a telecommunications system operating in conjunction with both a first radio access network having a first type radio access technology and a second radio access network having a second type radio access technology.

FIG. 2 shows another example telecommunications system 10' operating in conjunction with both first radio access network 12' and second radio access network 14'. In the example telecommunications system 10 of FIG. 1, first radio access network 12' operates at a first radio frequency (f1) while the second radio access network 14' operates at a second frequency (f2). As in the FIG. 1 example, both first radio access network 12' and second radio access network 14' are connected to an external core network 16 which can comprise, or otherwise have access to, neighbor relation list (NRL) handler 18.

The first radio access network 12' optionally comprises one or more base station controllers (BSCs) 26.sub.1*f*, with each base station controller (BSC) 26.sub.1*f* (when deployed) controlling one or more base stations (BTSs) 28.sub.1*f*, the base stations (BTS) 28.sub.1*f* serving cells C.sub.1*f* in much the same manner as in FIG. 1. Likewise, the second radio access network 14' optionally includes one or more radio network controllers (RNCs) 26.sub.2*f*, with each RNC node 26.sub.2*f* (when deployed) connected to one or more base stations (BS) 28.sub.2*f* serving cells C.sub.2*f*.

It should be appreciated that the technology described herein pertains to one or both of the inter-RAT type of operation depicted in FIG. 1 (comprising radio access networks of different radio technology access types) and the inter-frequency type of operation depicted in FIG. 2 (comprising radio access networks of different radio frequencies). For this reason the inclusive nomenclature inter-RAT/frequency is employed. The entire subsequent discussion including reference to ensuing figures encompasses both types of operation, e.g., both inter-RAT and inter-frequency, unless specifically stated otherwise or clear from the context.

Figure 3:
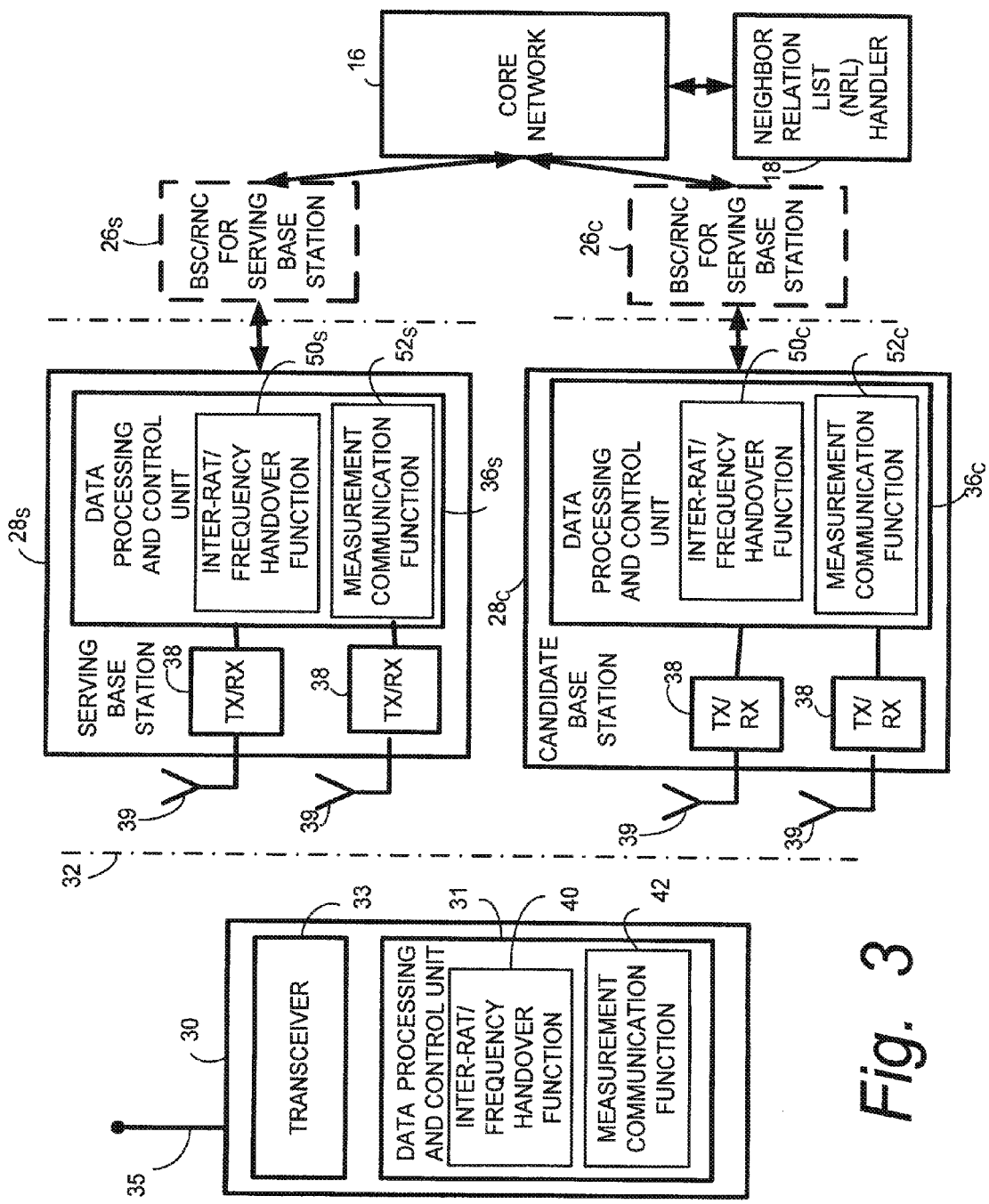
FIG. 3 is a simplified function block diagram showing certain example aspects of a representative mobile terminal and radio access network nodes which are involved in an example inter-RAT/frequency handover.

In view of the applicability of the technology both to inter-RAT operation and inter-frequency operation, FIG. 3 generically shows serving base station 28.sub.S and candidate base station 28.sub.C. The serving base station 28.sub.S can belong to one type of radio access technology, while candidate base station 28.sub.C can belong to another type of radio access technology. In such example, it does not make any difference for the purpose of FIG. 3 as to what types of differing radio access technologies are employed in the radio access networks of serving base station 28.sub.S and candidate base station 28.sub.C. Alternatively, serving base station 28.sub.S can belong to a radio access network (or base station) which operates at a first frequency, while candidate base station 28.sub.C can belong to a radio access network (or base station) which operates at a first frequency. Further, FIG. 3 shows serving base station 28.sub.S and candidate base station 28.sub.C as (optionally) being connected to controlling nodes such as a BSC/RNC type node, and particularly to nodes 26.sub.S and 26.sub.C, respectively. FIG. 3 shows selected general aspects of mobile station (MS) 30 and selected functionalities of the serving base station 28.sub.S and candidate base station 28.sub.C.

The mobile station (MS) 30 shown in FIG. 3 includes a data processing and control unit 31 for controlling various operations required by mobile station (MS) 30. The data processing and control unit 31 of mobile station (MS) 30 includes mobile terminal inter-RAT/frequency handover function 40 and measurement communication function 42, the purposes of which are described in more detail subsequently. In addition, the data processing and control unit 31 provides control signals as well as data to radio transceiver 33 connected to antenna 35. The measurement communication function 42 controls communications with serving base station 28.sub.S and candidate base station 28.sub.C when requesting or obtaining measurements or information (e.g., measurements or information for potential handover purposes) are concerned. The inter-RAT/frequency handover function 40 actually is invoked when it is determined that a handover is to occur.

By way of example and non-exhaustive description, both serving base station 28.sub.S and candidate base station 28.sub.C as shown in FIG. 3 comprise base station data processing and control unit 36, which is connected to one or more base station transceivers (TX/RX) 38. Each base station transceiver (TX/RX) 38 is connected to a corresponding antenna 39, an appropriate one of which communicates over an air interface with mobile station (MS) 30.

The data processing and control unit 36 of each of serving base station 28.sub.S and candidate base station 28.sub.C comprise inter-RAT/frequency handover function 50 and measurement communication function 52. For example, serving base station 28.sub.S comprises inter-RAT/frequency handover function 50.sub.S and measurement communication function 52.sub.S, while candidate base station 28.sub.C comprises inter-RAT/frequency handover function 50.sub.C and measurement communication function 52.sub.C, For each base station, the respective measurement communication function 52 controls communications with mobile station (MS) 30 for requesting or obtaining measurements or information (e.g., measurements or information for potential handover purposes); the respective inter-RAT/frequency handover function 50 is invoked when it is determined that a handover is to occur.

Any or all of mobile terminal inter-RAT handover function 40; measurement communication function 42; inter-RAT/frequency handover function 50; and/or measurement communication function 52 can comprise a controller or processor as those terms are expansively described herein. Although not specifically referenced at very juncture of discussion, these functions are involved in performing acts described herein and as summarized briefly above.

1.2 Example Operation Overview

Figure 4:
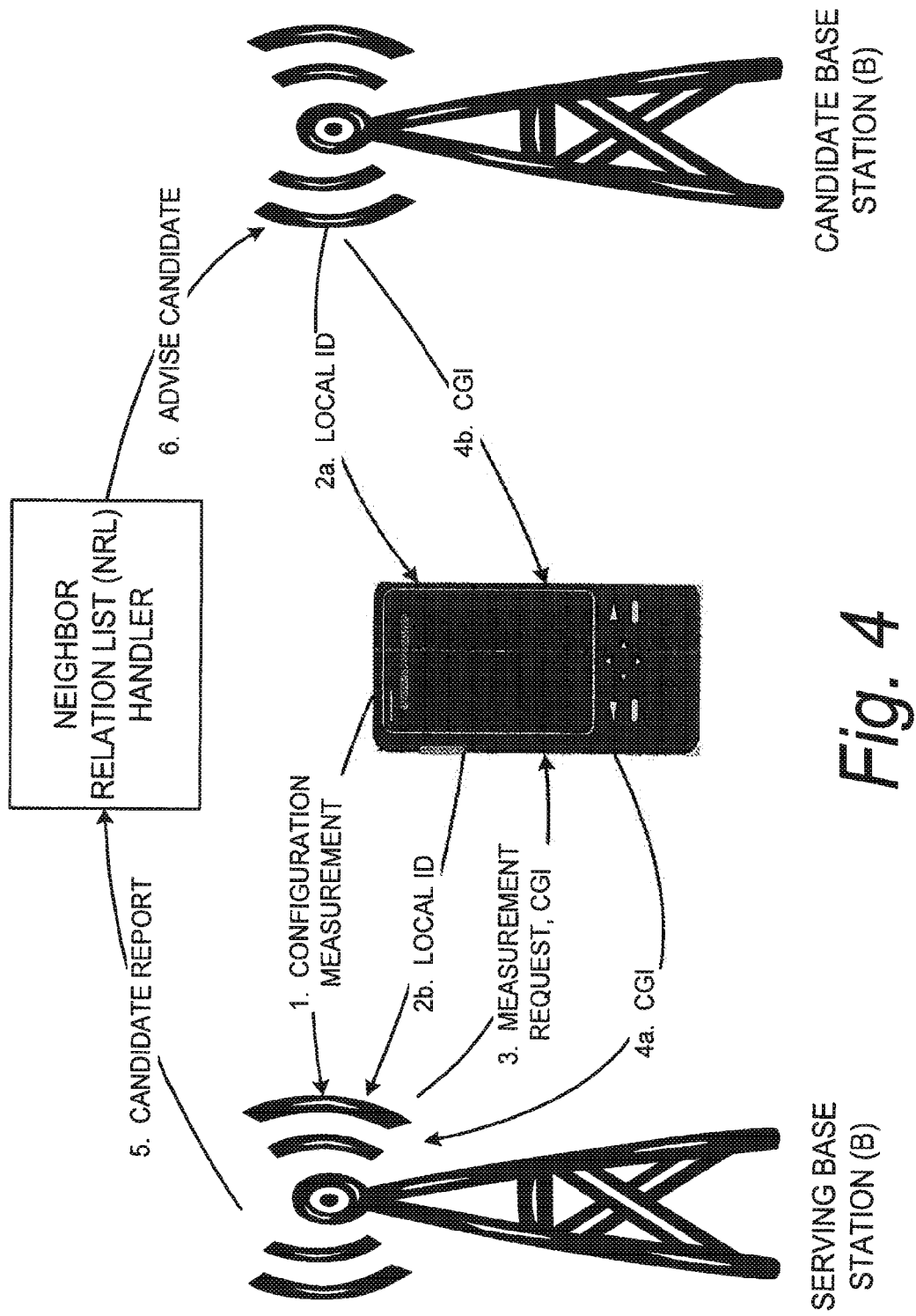
FIG. 4 is a diagrammatic view showing communications between a serving radio base station, a mobile station (MS), and a candidate radio base station pertaining to measurements performed for detection and identification of inter-RAT/frequency neighbors, wherein the serving radio base station and the candidate radio base station belong to different RATs and/or frequencies.

FIG. 4 illustrates certain basic example, non-limiting acts or steps which comprise an inter-RAT/frequency measurement scenario. Inter-RAT/frequency measurements from certain mobile stations chosen using the triggering condition(s) described in Section 2.0 are used to detect new inter-RAT/frequency neighbors, as illustrated in FIG. 4, act (1). The actual triggering condition(s) comprising, e.g., rules and thresholds, may be evaluated at the base station (BS) or the mobile station (MS). In the former case, the base station (BS) receives measurements from the mobile station (MS) and evaluates the triggering conditions. In the latter case, the base station (BS) informs the mobile station (MS) regarding the triggering conditions and the mobile station (MS) evaluates the conditions and starts inter-RAT/frequency measurements once they are triggered. In the measurement configuration sent from the base station (BS) to the mobile station (MS) (FIG. 4, act (1)), the base station (BS) may include information needed to perform the measurement [for example the Absolute Radio Frequency Channel Numbers (ARFCNs) for GERAN BSs and ARFCNs and scrambling codes for UTRAN BSs].

The mobile station (MS) measures the signal quality of surrounding inter-RAT/frequency base stations once the condition(s) in Section 2.0 are triggered. As shown by act (2*a*) of FIG. 4, the measurements are performed during reading gaps (explained above) and (as shown by act (2*b*) of FIG. 4) each measurement result is reported to the serving base station (BS) together with the local ID of the base station (BS). The local ID can take the form, for example, of the Base Station Identity Code (BSIC) for GERAN or the scrambling code for UTRAN.

If the serving base station (BS) has no prior knowledge of a neighbor base station (BS) with the reported local ID, the serving base station (BS) may send a CGI measurement request to the mobile station (MS), as illustrated by act (3) in FIG. 4. As illustrated by act (4b) of FIG. 4, the mobile station (MS) measures the Cell Global Identity (CGI) of the candidate base station (BS), using, e.g., one of the embodiments and modes presented in Section 3.0, and (as illustrated by act (4a)) reports the Cell Global Identity (CGI) to the serving base station (BS). In an example embodiment, the mobile station measurement communication function 42 can be configured to receive and send communications which comprise the acts of FIG. 4, including the acts of measuring the Cell Global Identity (CGI) of the candidate base station (BS) as in act (4b) of FIG. 4 and reporting the Cell Global Identity (CGI) to the serving base station (BS) as in act (4a) of FIG. 4. In an example embodiment, the base station measurement communication function 52 can be configured to receive and send communications such as those shown in FIG. 4 and which enable or allow the mobile station to perform acts of FIG. 4.

Based on the inter-RAT/frequency measurement reports and the information retrieved from the lookup, the candidate base station (BS) can be added to the neighbor relation list (NRL) of the serving base station (BS). As illustrated by optional act (5) of FIG. 4, the serving base station (BS) can inform an NRL handler, such as an Operation and Support System (OSS) or any other management node, about the newly detected candidate base station (BS). As illustrated by optional act (6) of FIG. 4, the NRL handler informs the candidate base station (BS) regarding the new neighbor relation. Upon being so informed, the candidate base station (BS) adds an entry corresponding to the serving base station (BS) in its NRL.

2.0 INTER-RAT/FREQUENCY MEASUREMENT TRIGGERING

Figure 6:
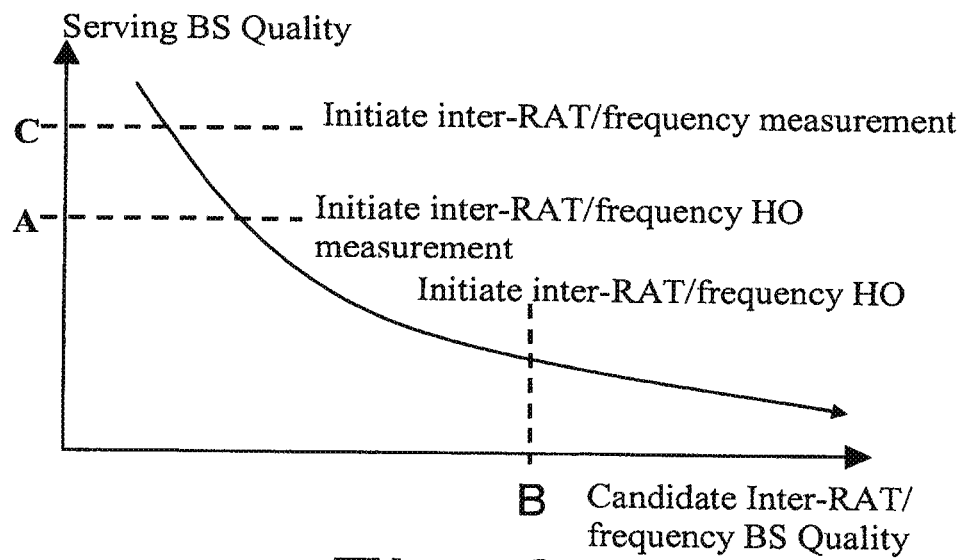
FIG. 6 is a graphical view showing that a inter-RAT/frequency measurement threshold may be set higher than the corresponding handover threshold.

Different triggering criteria for inter-RAT/frequency measurements are possible. Suggested criteria include but are not limited to the following: a) Mobile stations with low data rates perform inter-RAT/frequency measurements. Retransmissions due to poor channel quality may result in a greater actual transmitted data than required by the services in the mobile station (MS). Therefore, the criterion for choosing mobile stations for measurements must be based on the actual transmitted UL and DL data rates to the mobile station (MS). b) Mobile stations with an estimated signal quality of the serving base station (BS) below a given threshold (see threshold C in FIG. 6) perform inter-RAT/frequency measurements.

Figure 5:
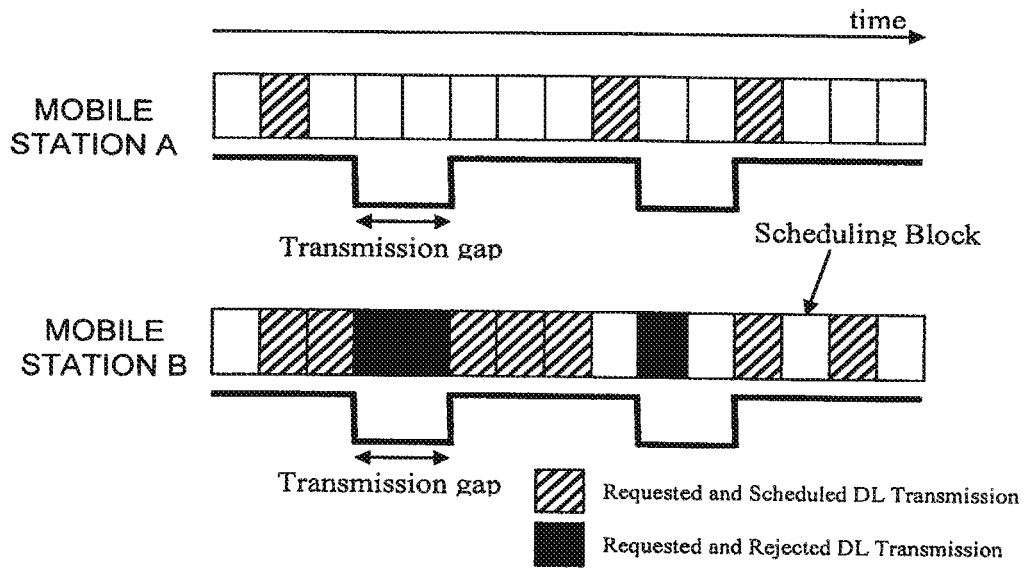
FIG. 5 is a diagrammatic view illustrating that a mobile station (MS) is not able to receive from a serving radio base station during a reading gap; that quality of service (QoS) [bandwidth and/or latency) may degrade significantly for mobile stations with higher bandwidth requirement or greater number of requested scheduling blocks (e.g., mobile station B) compared to mobile stations with less bandwidth requirements (e.g., mobile station A).
Figure 15:
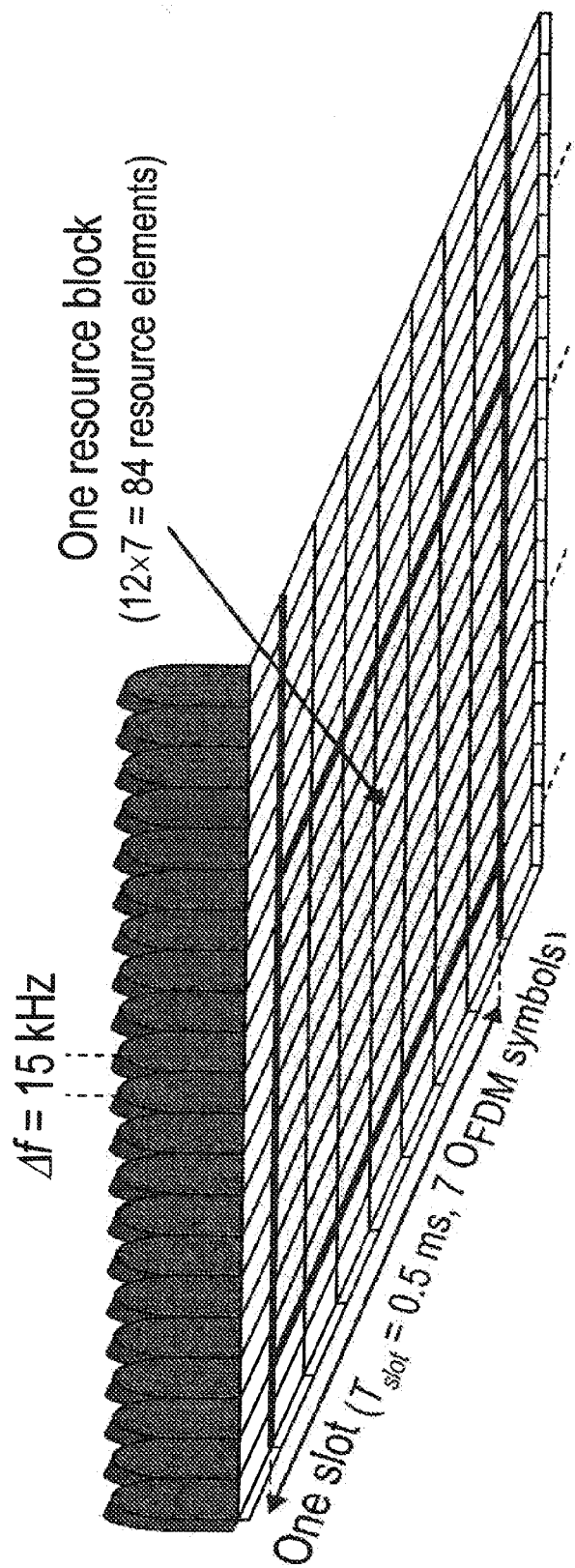
FIG. 15 is a diagrammatic view illustrating scheduling in E-UTRAN wherein resources are allocated both in frequency and time to a mobile station (MS).

Considering criteria a) described above, recall from the discussion concerning, e.g., FIG. 15, that a scheduling block (SB) is the smallest schedulable entity and that the base station (BS) may control the UL and DL transmissions including retransmissions for a particular mobile station (MS). The impact on a service, e.g., video streaming, when performing inter-RAT/frequency measurements is smaller for mobile stations that require less number of scheduling blocks (SBs), as shown in FIG. 5. As such, mobile stations with a low average number of scheduled scheduling blocks (SBs) should perform inter-RAT/frequency measurements.

The threshold used in criteria b) can either be the same threshold as is used for inter-RAT/frequency handover measurements (e.g., threshold A in FIG. 6), or it can be set higher than the handover threshold (e.g., higher than threshold A of FIG. 6, such as threshold C in FIG. 6)) to make sure that an inter-RAT/frequency neighbor is found before the mobile station (MS) falls out of coverage.

The usage of the triggering criterion a) and b), and the setting of the threshold used in criteria b) can vary with different situations. For example a newly deployed base station (BS) may have many unknown neighbors and in order to find them quickly both alternatives a) and b) could be used. In a newly deployed base station (BS) it may also be suitable to set the inter-RAT/frequency threshold (C in FIG. 6) higher than the handover (HO) measurement threshold. For a base station (BS) that has been in the network for some time, most of the neighbors can be assumed to be found already and it may be enough to use only criteria b) with the same threshold as for handover measurements.

Furthermore, the threshold C can depend on the service, subscription type, UE type etc. For example, Gold subscription users are assigned lower threshold C than ordinary subscription users to avoid bulk measurements to a larger extent.

3.0 CELL GLOBAL IDENTITY (CGI) MEASUREMENTS

Assume that the mobile station (MS) has reported a candidate base station (BS) in another RAT/frequency and that the serving base station (BS) requests a CGI measurement (act 3 in FIG. 4). To measure the Cell Global Identity (CGI) of a base station (BS) in another RAT/frequency, the mobile station (MS) has again to tune in to the frequency of the base station (BS) and stop listening to the serving RAT/frequency for the time needed to measure the desired information of the candidate RAT/frequency. To obtain the Cell Global Identity (CGI) of a candidate base station (BS) it may be needed to first obtain synchronization, then the actual time when the CGI is transmitted needs to be obtained, and finally the CGI can be measured. This technology suggests a number of different ways, e.g., different embodiments and modes, to handle the measurements of information transmitted from a base station (BS) in a different RAT/frequency. As used herein, "measurements" can refer to any and all entities or types of information, e.g., synchronization and local ID, that must be known in order to obtain the Cell Global Identity (CGI). Consequently, the embodiments and modes may be used to measure any information transmitted by a base station (BS) in a different RAT/frequency, not only the Cell Global Identity (CGI).

3.1 First Embodiment/Mode (Method a)

In a first example embodiment and mode, also known as "method a" or "solution a" and illustrated in FIG. 7, the serving base station (BS) issues a transmission gap of length T, where T is the worst case time to obtain the desired information from the candidate base station (BS). During this gap the mobile station (MS) measures the desired information. Note, this solution requires that the serving base station (BS) be aware of the worst case time T.

As a variation of the first example embodiment and mode, also known as "method d" or "solution d", the mobile station (MS) informs the base station (BS) that it will measure during a reading gap of length T. The serving base station (BS) creates a transmission gap during this period. This method is a subset of method a), however, in this case the mobile station (MS) initiates the transmission gap.

3.2 Second Embodiment/Mode (Method b)

In a second example embodiment and mode, also known as "method b" or "solution b" and illustrated in FIG. 8, the serving base station (BS) starts a transmission gap right after transmitting the measurement request to the mobile station (MS). During this gap, the mobile station (MS) measures the desired information. The transmission gap ends as soon as the serving base station (BS) receives the measurement result from the mobile station (MS). The gap will have the maximum length T, where T is the worst case time to obtain the desired information. In contrast to solution a), the length of T must not be known in advance.

As a variation of the second example embodiment and mode, also known as "method e" or "solution e", the mobile station (MS) starts a reading gap right after sending a transmission gap message to the serving base station (BS). The base station (BS) issues a transmission gap that ends as soon as the base station (BS) receives the measurement result from the mobile station (MS). This method is analogous to method b), however, in this case the mobile station (MS) initiates the transmission gap

3.3 Third Embodiment/Mode (Method c)

In a third example embodiment and mode, also known as "method c" or "solution c" and illustrated in FIG. 9, the serving base station (BS) issues periodic transmission gaps of fixed length where the mobile station (MS) measures the desired information. Assume that the desired information is transmitted periodically. Under certain conditions the transmission gaps will slide relatively to the broadcast frames for the desired information and eventually align with one of these broadcast frames.

3.4 Fourth Embodiment/Mode (Method f)

In a fourth example embodiment and mode, also known as "method f" or "solution f", The mobile station (MS) issues a reading gap and ignores transmissions from the serving RAT/frequency during this time in order to perform inter-RAT/frequency measurements, without reporting this to the serving base station (BS). During inter-RAT/frequency measurements the mobile station (MS) is not reachable. The network will experience the same behavior as if the mobile station (MS) was passing through a shadow region.

A serving base station (BS) can ensure that no SBs (DL and UL transmissions) are allocated for a mobile station (MS) when it is performing inter-RAT/frequency measurements. The methods a)-e) ensure that no DL and UL transmissions occur during the time interval when the mobile station (MS) is measuring another RAT/frequency and, therefore, is not able to communicate with the serving RAT/frequency. Methods a)-c) are initiated by the serving base station (BS), which is aware of the time interval during which the mobile station (MS) is performing inter-RAT/frequency measurements. Methods d) and e) are initiated by the mobile station (MS), which informs the serving base station (BS) that it will carry out inter-RAT/frequency measurements.

Method f) may result in loss of radio frames, since the mobile station (MS) abruptly changes frequency in order to perform inter-RAT/frequency measurements. However, this is not expected to be significant problem since any loss of frames is recovered using Hybrid Automatic Repeat Request (HARQ). Further, a mobile station (MS) may be configured to send CQI reports to the base station (BS). A mobile station (MS) that is performing inter-RAT/frequency measurements may not be able to send pre-determined reports (e.g., CQI reports and (N)ACKs) to the serving RAN. Further, the base station (BS) knows that the mobile station (MS) at some unknown time will stop listening to the serving base station (BS) in order to perform the inter-RAT/frequency measurements. Therefore, the lack of incoming pre-determined reports (e.g., CQI reports) form a certain mobile station (MS) and/or the knowledge that a measurement request has been sent to the same mobile station (MS) (which has not yet reported the measurements results) can be used as an indication that the mobile station (MS) is currently performing inter-RAT/frequency measurements. As such, the scheduler may be configured such that it lowers the priority of transmissions to that mobile station (MS) or does not allocate any scheduling blocks (SBs) to that mobile station (MS). The consequence of this is that the drop probability of radio frames to a mobile station (MS) performing inter-RAT/frequency measurements is lowered and that the scheduler can allocate SBs to other mobile station (MS).

4.0 MEASUREMENT ENHANCEMENTS/VARIATIONS

Some example embodiments can use a two-stage information acquisition procedure for acquiring the ultimate necessary information (e.g., Cell Global Identity (CGI)) of the candidate base station. In the two stage information acquisition procedure, a first type of information is first acquired from the candidate base station. The first type of information is utilized to determine how to obtain a second type of information (e.g., the ultimately sought information, such as CGI) from the candidate base station.

Figure 10:
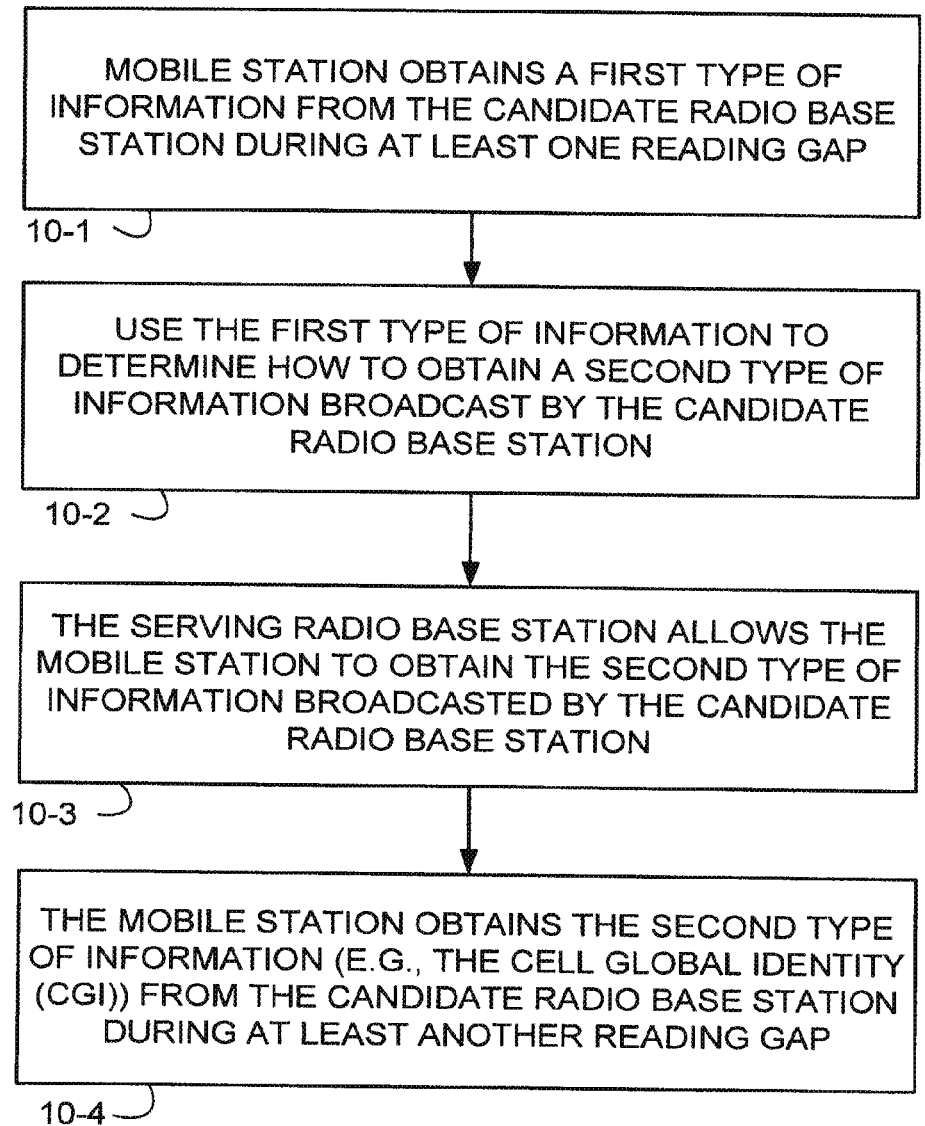
FIG. 10 is a flowchart showing example, representative acts or steps involved in an example two-stage information acquisition procedure.

FIG. 10 shows example, representative acts or steps involved in an example two-stage information acquisition procedure. Act 10-1 comprises the mobile station obtaining a first type of information from the candidate radio base station during at least one reading gap. The first type of information can be any information which will facilitate determining how to obtain the second type of information. For example, the first type of information can be frame number or scheduling information broadcast from the candidate base station. The reading gap for act 10-1 is a time period in which the mobile station does not receive information from the serving radio base station. In an example implementation of the FIG. 10 procedure, the serving radio base station allows the mobile station to obtain the first type of information broadcasted by the candidate radio base station.

Act 10-2 of the example two-stage information acquisition procedure of FIG. 10 comprises using the first type of information to determine how to obtain a second type of information broadcast by the candidate radio base station. The determination can be made either by the mobile station (MS) (as in the example implementation described with respect to FIG. 11 below) or by the serving base station (as in the example implementation described with respect to FIG. 12 below).

Act 10-3 of the example two-stage information acquisition procedure of FIG. 10 comprises the serving radio base station allowing the mobile station to obtain the second type of information broadcasted by the candidate radio base station. As used herein, the serving base station "allowing" the mobile station to obtain the second type of information can include the serving base station to permit or authorize the mobile station to obtain the second type of information, but in at least one embodiment the mobile station, although permitted or authorized, may ignore transmissions from the serving base station in order to obtain information from the candidate base station. Act 10-4 comprises the mobile station obtaining the second type of information (e.g., the Cell Global Identity (CGI)) from the candidate radio base station during at least another reading gap.

One or a combination of the methods, presented in Section 3.0, can be used to measure desired information from base stations in other RATs/frequencies. Moreover, the first type of information (acquired in act 10-1 of FIG. 10, for example) can be acquired using one of the methods of Section 3.0, and the second type of information (acquired in act 10-4 of FIG. 10, for example) can be acquired using another (e.g., different) ones of the methods of Section 3.0. In other words, it is not necessary that the same method be used to acquire the first type of information (which is used to help locate the second type of information) and the second type of information.

Inter-RAT/frequency measurements could give less disturbances of the carried traffic to the serving base station (BS) if synchronization information and possibly other measured information from the candidate base station (BS) are used to find the time interval when the desired information, e.g., Cell Global Identity (CGI), is transmitted. With this information, for example method a) or b) as described in Section 3.1 and Section 3.2 can be utilized during this given time only, which leads to less or no disturbance of the ongoing traffic in the serving RAT/frequency. If the candidate base station (BS) synchronization is not already known it can be found by using one of methods a)-f), as described in Section 3.0.

Act 10-2 of FIG. 10 involves using the first type of information to determine how to obtain the second type of information broadcast by the candidate radio base station. Determining how to obtain the second type of information can include calculating the transmission time interval for the desired information based on measurement results (the first type of information), such as current frame number and possibly scheduling information, can be done either by the mobile station (MS) or by the serving base station (BS) provided that the needed information has been reported by the mobile station (MS).

Figure 11:
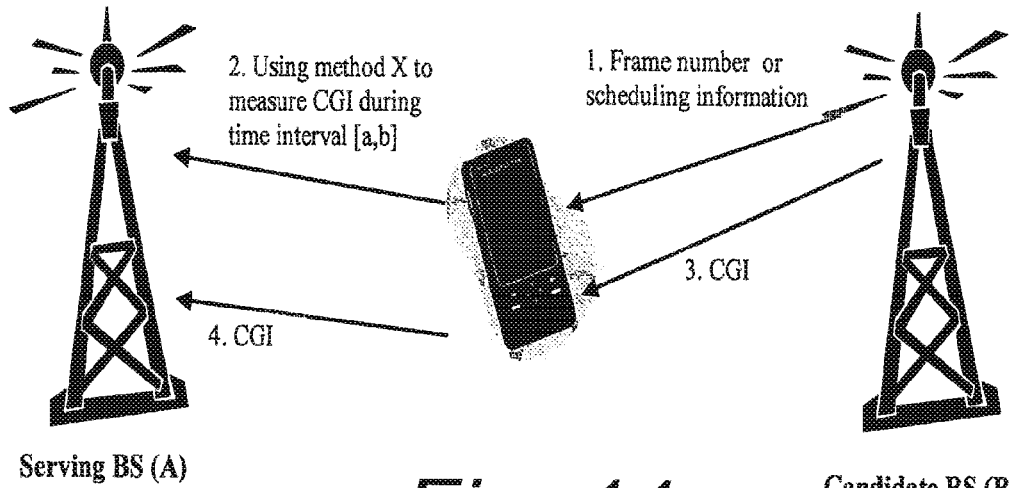
FIG. 11 is a diagrammatic view showing communications between a serving radio base station, a mobile station (MS), and a candidate radio base station pertaining to measurements performed for detection and identification of inter-RAT/frequency neighbors, wherein the serving radio base station and the candidate radio base station belong to different RATs and/or frequencies; and particularly wherein the mobile station (MS) measures frame number or scheduling information regarding the information broadcasted by the candidate BS, computes a time interval when the CGI of the candidate radio base station will be transmitted, and notifies the serving RAT when the Cell Global Identity (CGI) will be measured.

FIG. 11 illustrates an example scenario in which the mobile station (MS) informs its serving base station (BS) of the time interval when a method for inter-RAT/frequency measurements is used. For example, act 1 in FIG. 11 shows the mobile station (MS) acquiring the frame number or scheduling information from the candidate base station. Act 2 of FIG. 11 represents the mobile station (MS) advising the serving base station that the mobile station (MS) is using a particular method (represented generically as method "X" in FIG. 11) to measure the CGI during a certain time interval (represented by time interval "[a,b]" in FIG. 11). Act 3 of FIG. 11 shows the mobile station (MS) actually measuring or acquiring the CGI of the candidate base station during the time interval that was announced in act 2 of FIG. 11. Act 4 of FIG. 11 depicts the mobile station (MS) informing the serving base station of the CGI which was acquired as a result of act 3 of FIG. 11.

Figure 12:
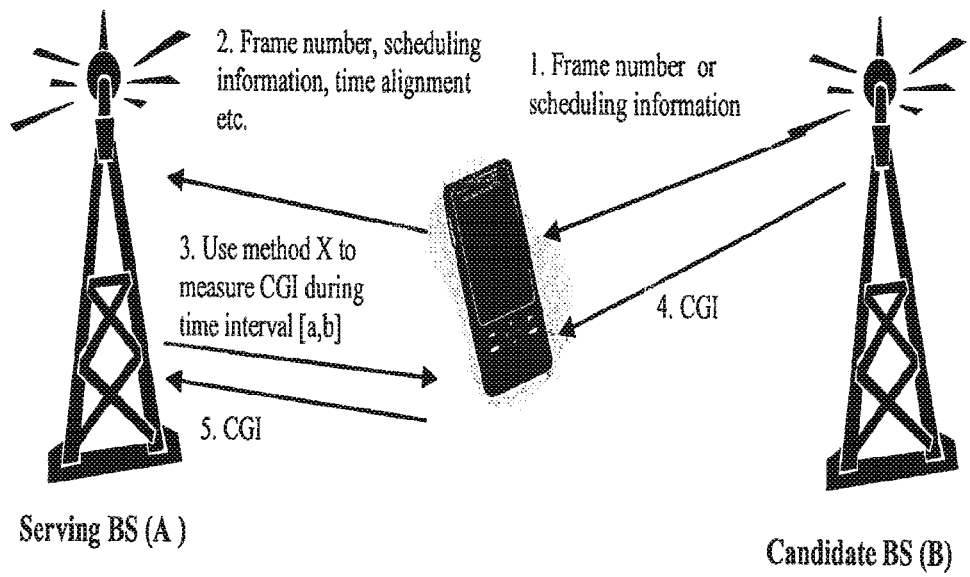
FIG. 12 is a diagrammatic view showing communications between a serving radio base station, a mobile station (MS), and a candidate radio base station pertaining to measurements performed for detection and identification of inter-RAT/frequency neighbors, wherein the serving radio base station and the candidate radio base station belong to different RATs and/or frequencies; and particularly wherein the mobile station (MS) measures the frame number of scheduling information, the serving radio base station computes a time interval when the Cell Global Identity (CGI) of the candidate radio base station will be transmitted and notifies the mobile station (MS) when the Cell Global Identity (CGI) should be measured using a particular method.
Figure 13:
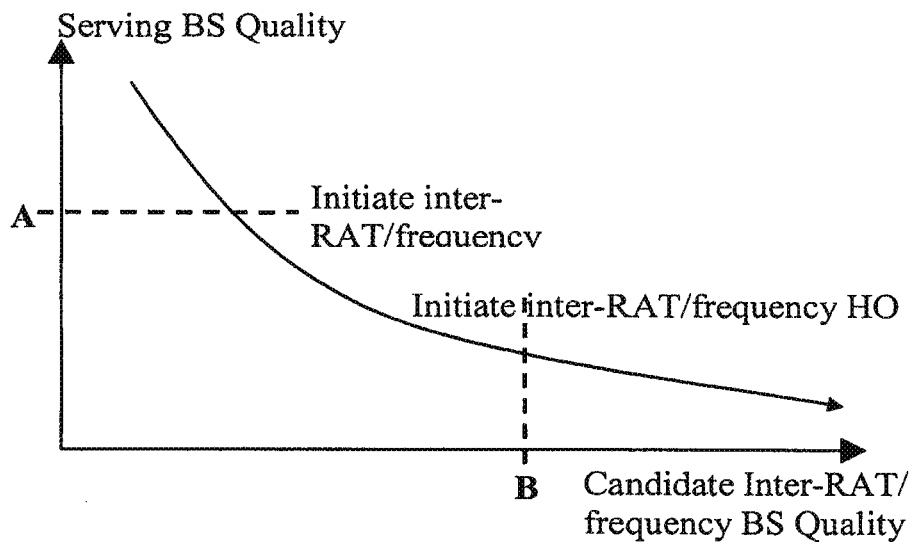
FIG. 13 is a graph reflecting signal quality as a mobile station (MS) moves away from coverage of a serving radio base station into coverage of a candidate radio base station having a different radio access technology (RAT) and/or different frequency.
Figure 14:
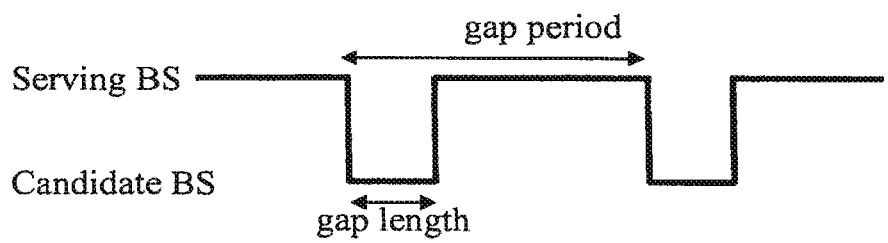
FIG. 14 is a diagrammatic view showing how a mobile station (MS) may alternate between a serving radio base station and a candidate radio base station when carrying out inter-RAT/frequency measurements, and particularly showing a case in which reading gaps occur with a certain period and the gap length is constant.

FIG. 12 illustrates another example scenario, and particularly a scenario in which the serving base station (BS) instructs the mobile station (MS) of the time interval when a method for inter-RAT/frequency measurements should be used. Act 1 of FIG. 12 shows the mobile station (MS) acquiring the frame number or scheduling information from the candidate base station. Act 2 of FIG. 11 represents the mobile station (MS) advising the serving base station of information of the candidate base station, such as the frame number, scheduling information, time alignment, etc. Act 3 of FIG. 12 depicts the serving base station directing the mobile station (MS) to use a particular method (represented generically as method "X" in FIG. 12) to measure the CGI during a certain specified time interval (represented by time interval "[a,b]" in FIG. 12). Act 4 of FIG. 12 shows the mobile station (MS) actually measuring or acquiring the CGI of the candidate base station during the time interval that was prescribed in act 3 of FIG. 12. Act 5 of FIG. 12 shows the mobile station (MS) informing the serving base station of the CGI which was acquired as a result of act 4 of FIG. 12.

As a further alternative, the mobile station (MS) may decide not to inform the base station (BS) regarding the time interval and simply start measuring the desired information as proposed in method of Section 3.4.

5.0 EXAMPLE IMPLEMENTATIONS

5.1 First Example

A first example implementation for measuring the Cell Global Identity (CGI) of a base station (BS) in another RAT/frequency is now described. Assume that the triggering condition(s) outlined in Section 2.0 has been satisfied and the mobile station (MS) is to start inter-RAT/frequency measurements. Then the mobile station (MS) may need to synchronize and measure the signal quality of a candidate base station (BS). This is done in the currently described example implementation using method c) in Section 3.3 with sliding transmission gaps. The serving base station (BS) may request the mobile station (MS) to measure the Cell Global Identity (CGI) of the candidate base station (BS), i.e., act 3 in FIG. 4. If the mobile station (MS) is at this state not aware of when the Cell Global Identity (CGI) of the candidate base station (BS) will be transmitted, it attains the scheduling information using method f) in Section 3.4. The scheduling information may be based on the frame number (as in e.g., GERAN) or any other explicit scheduling information broadcasted by the candidate base station (BS) (e.g., UTRAN). The mobile station (MS) then computes the time interval during which the CGI of the candidate base station (BS) is transmitted and measures the CGI using method f), meaning that the mobile station (MS) ignores transmissions from the serving RAT/frequency during the measurement time.

5.2 Second Example

The second example pertains to retrieving CGI from a GERAN BS while connected to another RAT/frequency. In GERAN the CGI is transmitted on the BCH. The TDMA frame number where the CGI will be transmitted is specified in 3GPP TS 45.002, Multiplexing and multiple access on the radio path. By using for example method c) (in Section 3.0) with sliding transmission gaps the FCCH for frequency fine-tuning and the SCH for synchronization can be measured. When the SCH has been read, the mobile station (MS) will know the current frame number. If the mobile has kept the synchronization to the GERAN base station (BS) since the local ID was measured, the current frame number is already known, and the mobile will not need to perform additional measurements of FCCH and SCH.

Once the current frame number is known, the mobile station (MS) is able to calculate the time interval to measure the CGI. This measurement is performed using for example method f) (in Section 3.4), i.e. the mobile station (MS) measures the CGI of the GERAN base station (BS) and ignores transmissions from the serving RAT/frequency during the measurement time. The mobile station (MS) then reports the measured CGI to the base station (BS).

5.3 Third Example

The third example pertains to retrieving CGI from an UTRAN base station (BS) while connected to another RAT/frequency. In UTRA the CGI is transmitted on the Primary Common Control Physical Channel (P-CCPCH) 3GPP TS 25.331, Radio Resource Control (RRC); Protocol specification. The radio frame in which the CGI is transmitted is given by the Master Information Block (MIB), which is also transmitted in the P-CCPCH. The mobile station (MS) must therefore first read the information contained in the MIB and then read the CGI.

The mobile station (MS) synchronizes and obtains the scrambling code of the candidate base station (BS) by using for example method c) (in Section 3.3) with sliding transmission gaps. When synchronized, the mobile station (MS) starts reading the P-CCPCH and obtains the System Frame Number (SFN). The mobile station (MS) calculates the frame and the time interval in which the MIB is transmitted using the SFN. The mobile station (MS) reads the contents of the MIB, using for example method f) (in Section 3.4), and obtains the frame and the time interval in which CGI is transmitted. The mobile station (MS) then reads the CGI using for example method f) (in Section 3.4) and reports the CGI to the serving base station (BS).

6.0 EXAMPLE ADVANTAGES

Automatic inter-RAT/frequency NRL management as described herein leads to lower costs for the operators in planning and maintaining neighbor relation lists (NRLs), which are needed for seamless inter-RAT/frequency mobility. The advantages offered by this technology include (without limitation): Very little or no human intervention is required when establishing neighbor relation lists (NRLs). The methods presented are based on feedback information from the mobile stations and, as such, the automatic NRL (ANRL) management is responsive to changes in radio propagation conditions in the cell. Radio propagation models based on, e.g., topology, are not needed, since the invention relies on the feedback information from mobile stations. Very small or negligible disturbances are introduced in the carried traffic between the mobile stations and the base stations. A negligible traffic is introduced in the transport network between the base stations compared to previous art, some of which rely on the base stations to continuously exchange information regarding the mobile stations in their respective service areas. Inter-RAT/frequency NRL is supported in contrast to previous known solutions that only address one particular RAT.

Although the description above contains many specificities, these should not be construed as limiting the scope of the invention but as merely providing illustrations of some of the presently preferred embodiments. Therefore, it will be appreciated that the scope of the present invention fully encompasses other embodiments which may become obvious to those skilled in the art, and that the scope of the present invention is accordingly not to be limited. Reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed hereby. Moreover, it is not necessary for a device or method to address each and every problem sought to be solved by the present invention, for it to be encompassed hereby.

The invention claimed is:

1. A method in a mobile station for cell global identity acquisition comprising the steps of:
   issuing a reading gap, the reading gap being a time period in which the mobile station does not receive signals from a serving cell, the serving cell operating on a first frequency;
   receiving, during the reading gap, data broadcast on a second frequency by a candidate cell; and
   acquiring from said received broadcast data cell global identity (CGI) information for the candidate cell, wherein said CGI information comprises one or more of: a Cell Global Identity of the candidate cell, information for locating said Cell Global Identity, and a local identity (ID) for the candidate cell.

2. The method of claim 1, further comprising the steps of receiving from a radio base station serving the serving cell a measurement gap and issuing the reading gap as at least part of the received measurement gap.

3. The method of claim 1, further comprising the step of temporarily aborting a communication with a radio base station serving the serving cell to set up the issued reading gap.

4. The method of claim 1, wherein the serving cell operates in a first radio access technology and the candidate cell operates in a second radio access technology.

5. The method of claim 1, wherein the CGI information comprises said Cell Global Identity of the candidate cell.

6. The method of claim 1, wherein the CGI information includes said information for locating said Cell Global Identity.

7. The method of claim 1, wherein the CGI information is local identification information of a radio base station serving the candidate cell.

8. The method of claim 1, further comprising the steps of:
   obtaining a first type of information from the candidate cell during at least one reading gap; and,
   obtaining a second type of information from the candidate cell during at least another reading gap, each reading gap being a time period in which the mobile station does not receive information from the serving cell.

9. The method of claim 8, wherein the first type of information is information for locating Cell Global Identity of the candidate cell.

10. The method of claim 8, wherein the second type of information is Cell Global Identity of the candidate cell.

11. A mobile station for global cell identity acquisition comprising:
    a memory; and
    a processor coupled to the memory, the processor being configured to:
    issue a reading gap, the reading gap being a time period in which the mobile station does not receive signals from a serving cell, the serving cell operating on a first frequency;
    receive, during the reading gap, data broadcast on a second frequency by a candidate cell; and
    acquire from said received broadcast data cell global identity (CGI) information for the candidate cell, wherein said CGI information comprises one or more of: a Cell Global Identity of the candidate cell, information for locating said Cell Global Identity, and a local identity (ID) for the candidate cell.

* * * * *

UNITED STATES PATENT AND TRADEMARK OFFICE
CERTIFICATE OF CORRECTION

| | | |
|---|---|---|
| PATENT NO. | : 9,220,039 B2 | Page 1 of 1 |
| APPLICATION NO. | : 14/051090 | |
| DATED | : December 22, 2015 | |
| INVENTOR(S) | : Amirijoo et al. | |

It is certified that error appears in the above-identified patent and that said Letters Patent is hereby corrected as shown below:

On the Title Page, in Column 1, below Related U.S. Application Data, delete Item "(60)" and insert Item -- (63) --, therefor.

In the specification,
In Column 1, Line 5, delete "2011, pending," and insert -- 2011, now Pat. No. 8,583,104, --, therefor.

Signed and Sealed this
Nineteenth Day of April, 2016

Michelle K. Lee
*Director of the United States Patent and Trademark Office*